US012742486B2

(12) United States Patent
Baek et al.

(10) Patent No.: US 12,742,486 B2
(45) Date of Patent: Sep. 22, 2026

(54) SHOCK ABSORBER

(71) Applicant: HL MANDO CORPORATION, Gyeonggi-do (KR)

(72) Inventors: Kwangduk Baek, Gyeonggi-do (KR); Seungjoon Lee, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 980 days.

(21) Appl. No.: 17/987,852

(22) Filed: Nov. 15, 2022

(65) Prior Publication Data

US 2023/0287953 A1 Sep. 14, 2023

(30) Foreign Application Priority Data

Mar. 14, 2022 (KR) ........................ 10-2022-0031346

(51) Int. Cl.
*F16F 9/348* (2006.01)
*F16F 9/00* (2006.01)

(52) U.S. Cl.
CPC .......... *F16F 9/3482* (2013.01); *F16F 9/3485* (2013.01)

(58) Field of Classification Search
CPC ..................................................... F16F 9/3482
See application file for complete search history.

(56) References Cited

U.S. PATENT DOCUMENTS 2,729,308 A 1/1956 Koski et al.
4,768,629 A 9/1988 Wössner
9,091,320 B1 * 7/2015 Smith ....................... F16F 9/22

(Continued)

FOREIGN PATENT DOCUMENTS

CN 104919207 9/2015
CN 105593565 5/2016

(Continued)

OTHER PUBLICATIONS

Office Action dated Jul. 30, 2023 for Korean Patent Application No. 10-2022-0031346 and its English machine translation from Google Translate.

(Continued)

*Primary Examiner* — Melody M Burch
(74) *Attorney, Agent, or Firm* — WOMBLE BOND DICKINSON (US) LLP

(57) ABSTRACT

A shock absorber includes a tube divided into compression and rebound chambers by a piston valve movable upward and downward. The shock absorber comprises an elastic module disposed in the compression chamber and including a first elastic member, a central guide member disposed below the first elastic member and movable upward and downward, a second elastic member disposed below the central guide member, and a lower guide member supporting the second elastic member, and a disc module disposed in the compression chamber and including an upper retainer disposed below the central guide member and having flow paths formed in the upper retainer, upper discs disposed below the upper retainer and having flow paths formed at the upper discs, and lower discs disposed below the upper discs. The upper and lower discs are deformable to be curved downward to define a bypass flow path in response to applied hydraulic pressure.

20 Claims, 16 Drawing Sheets

(56) References Cited

U.S. PATENT DOCUMENTS

| | | | | |
|---|---|---|---|---|
| 2003/0234146 | A1* | 12/2003 | Grundei | F16F 9/061 188/316 |
| 2015/0152938 | A1* | 6/2015 | Park | F16F 9/3405 188/280 |
| 2015/0204411 | A1* | 7/2015 | Kus | F16F 9/3488 188/313 |
| 2017/0219043 | A1 | 8/2017 | Firek et al. | |
| 2018/0156302 | A1* | 6/2018 | Kus | F16F 9/585 |
| 2020/0011395 | A1* | 1/2020 | Sankaran | F16F 9/49 |
| 2021/0131517 | A1* | 5/2021 | Yasui | F16F 9/3484 |

FOREIGN PATENT DOCUMENTS

| | | |
|---|---|---|
| DE | 102 22 940 | 7/2003 |
| JP | 2001-271863 | 10/2001 |
| JP | 2021-181818 | 11/2021 |
| KR | 10-2020-0142839 | 12/2020 |

OTHER PUBLICATIONS

Office Action dated Mar. 11, 2025 for German Patent Application No. 10 2023 200 274.4 and its English translation provided by Applicant's foreign counsel.

Office Action (1st) dated Mar. 13, 2026 for Chinese Patent Application No. 202310084052.0 and its English translation by Global Dossier/Google Translate.

* cited by examiner (a)

(b)

(a)

(b)

SHOCK ABSORBER

CROSS-REFERENCE TO RELATED APPLICATION(S)

This application claims benefit and priority to Korean Patent Application No. 10-2022-0031346, filed on Mar. 14, 2022, with the Korean Intellectual Property Office, the disclosure of which is incorporated herein in its entirety by reference.

TECHNICAL FIELD

The present disclosure generally relates to a shock absorber, and more particularly, to a shock absorber capable of eliminating excessive hydraulic pressure generated in a hydraulic chamber by selectively forming a bypass route.

BACKGROUND

A shock absorber may refer to a device capable of generating a damping force by moving a piston and compressing a fluid stored in the shock absorber.

The function of the shock absorber may be used to inhibit or attenuate vibration transmitted from a road surface or absorb energy of vibration. Therefore, the shock absorber is used for a suspension system for a vehicle to improve the operating performance of the vehicle or ride quality.

A shock absorber in the related art generally generates a damping force only by using hydraulic pressure of a fluid. For this reason, the amount of fluid stored in the shock absorber as well as the sizes of components constituting the shock absorber need to be increased in order to increase the damping force.

However, the size of the shock absorber may need to be increased to increase the damping force provided by the shock absorber. This may cause to increase the costs required to manufacture the shock absorber or restrict a degree of freedom in respect to the installation of the shock absorber.

Meanwhile, when a compression process in which the piston pressurizes the fluid is continuously performed, excessive hydraulic pressure may be generated in a hydraulic chamber. When the excessive hydraulic pressure is applied to a flow path or components of the shock absorber, functions of internal components of the shock absorber may be degraded or the components of the shock absorber may be damaged.

The deterioration in function and damage to the components of the shock absorber may result in degrading the operating performance or ride quality of the vehicle, thereby causing a vehicle accident.

The contents disclosed in this section only provide background information in respect to the present disclosure but do not constitute prior art.

SUMMARY

Some exemplary embodiments of the present disclosure have been made in an effort to provide a shock absorber capable of improving a damping force while maintaining or reducing a size of the shock absorber.

Certain exemplary embodiments of the present disclosure have also been made in an effort to provide a shock absorber capable of eliminating or preventing excessive hydraulic pressure generated in a hydraulic chamber.

An exemplary embodiment of the present disclosure provides a shock absorber, which includes a tube filled with a fluid and divided into a compression chamber and a rebound chamber by a piston valve movable upward and downward, the shock absorber including: an elastic module disposed in the compression chamber and including a first elastic member, a central guide member disposed below the first elastic member and movable upward and downward, a second elastic member disposed below the central guide member, and a lower guide member disposed to support a lower end of the second elastic member; and a disc module disposed in the compression chamber and including an upper retainer disposed below the central guide member and having one or more flow paths formed in an outer peripheral surface of the upper retainer, one or more upper discs disposed below the upper retainer and each having one or more flow paths formed in an outer peripheral surface of each of the upper discs, and one or more lower discs disposed below the upper discs, in which the upper discs and the lower discs are curved downward to define a bypass flow path when applied hydraulic pressure is equal to or higher than preset hydraulic pressure.

Another exemplary embodiment of the present disclosure provides a shock absorber, which includes a tube filled with a fluid and divided into a compression chamber and a rebound chamber by a piston valve movable upward and downward, the shock absorber including: an elastic module disposed in the compression chamber and including a first elastic member, a central guide member disposed below the first elastic member and movable upward and downward, a second elastic member disposed below the central guide member, and a lower guide member disposed to support a lower end of the second elastic member; a first disc module disposed in the compression chamber and including an upper retainer disposed below the central guide member and having one or more flow paths formed in an outer peripheral surface of the upper retainer, one or more first upper discs disposed below the upper retainer and each having one or more flow paths formed in an outer peripheral surface of each of the first upper discs, and one or more first lower discs disposed below the first upper discs; and a second disc module disposed in the compression chamber and including one or more second upper discs disposed below the first lower discs and each having one or more flow paths formed in an outer peripheral surface of each of the second upper discs, and one or more second lower discs disposed below the second upper discs, in which the first upper discs and the first lower discs are curved downward to define a first bypass flow path when applied hydraulic pressure is equal to or higher than preset first hydraulic pressure, and in which the second upper discs and the second lower discs are curved downward to define a second bypass flow path when applied hydraulic pressure is equal to or higher than preset second hydraulic pressure.

Various exemplary embodiments of the present disclosure may provide a damping force generated by the fluid contained in a shock absorber and a damping force generated by an elastic member when a compression process of the shock absorber is performed. Therefore, it is possible to increase the damping force while maintaining or reducing the size of the shock absorber.

Some exemplary embodiments of the present disclosure may provide a structure capable of providing or forming a bypass route when the applied hydraulic pressure is excessive. Therefore, it is possible to prevent damage to components of the shock absorber or deterioration in performance of the shock absorber.

Certain exemplary embodiments of the present disclosure may adopt a two-stage structure capable of providing the plurality of bypass routes in a stepwise manner. Therefore, it is possible to provide or generate the hydraulic pressure having a predetermined value or greater even when the first stage of the two-stage structure provides the bypass route.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF EMBODIMENTS

Figure 1:
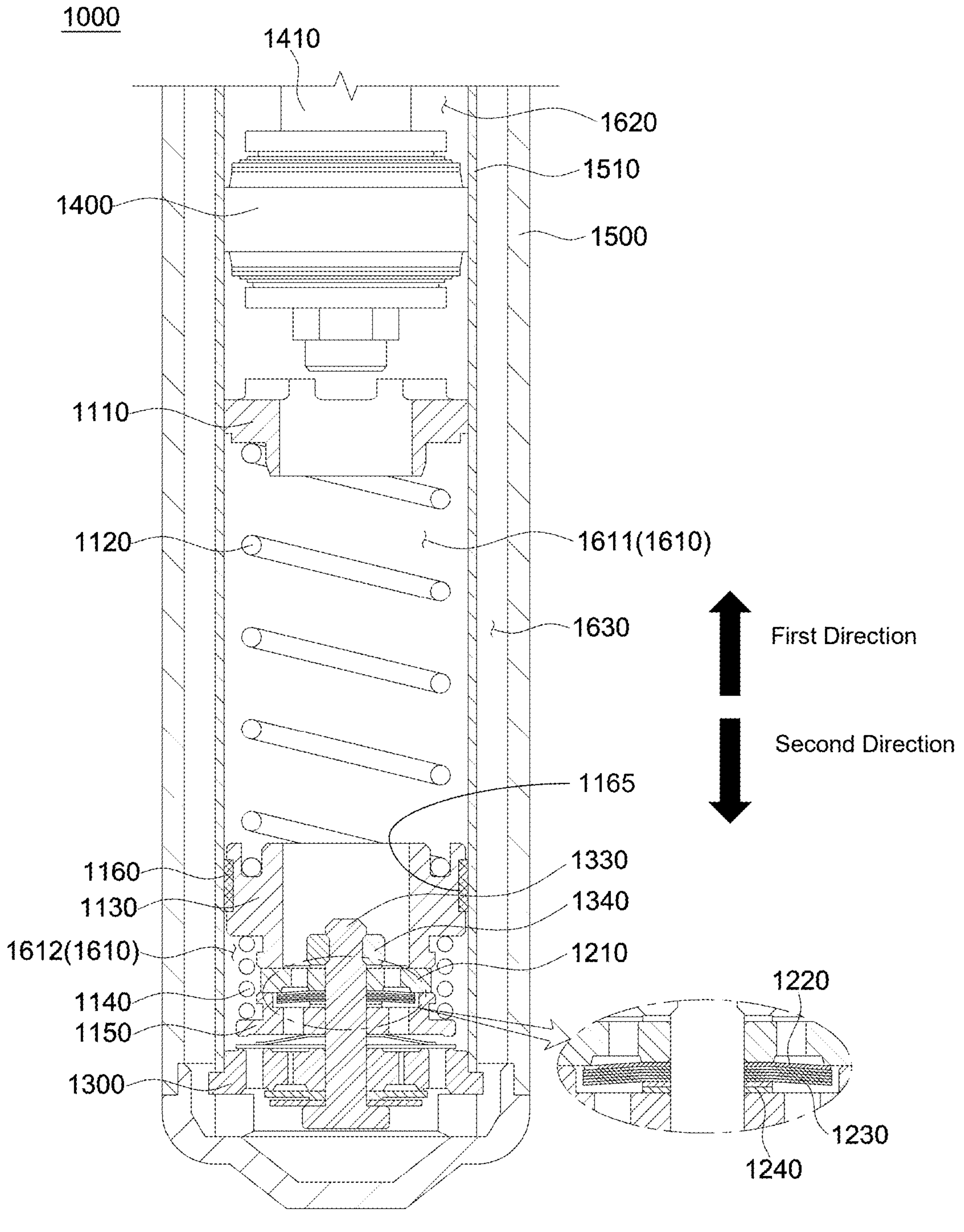
FIG. 1 is a cross-sectional view of a shock absorber according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, some embodiments of the present invention will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention.

The terms first, second, A, B, (a), (b), and the like may be used to describe constituent elements of the present disclosure. These terms are used only for the purpose of discriminating one constituent element from another constituent element, and the nature, the sequences, or the orders of the constituent elements are not limited by the terms. Throughout the specification, unless explicitly described to the contrary, the words “include”, “comprise” or “have” and variations such as “includes”. “including”, “comprises”, “comprising”, “has”, or “having”, will be understood to imply the inclusion of stated elements but not the exclusion of any other elements.

Embodiment 1

Figure 2:
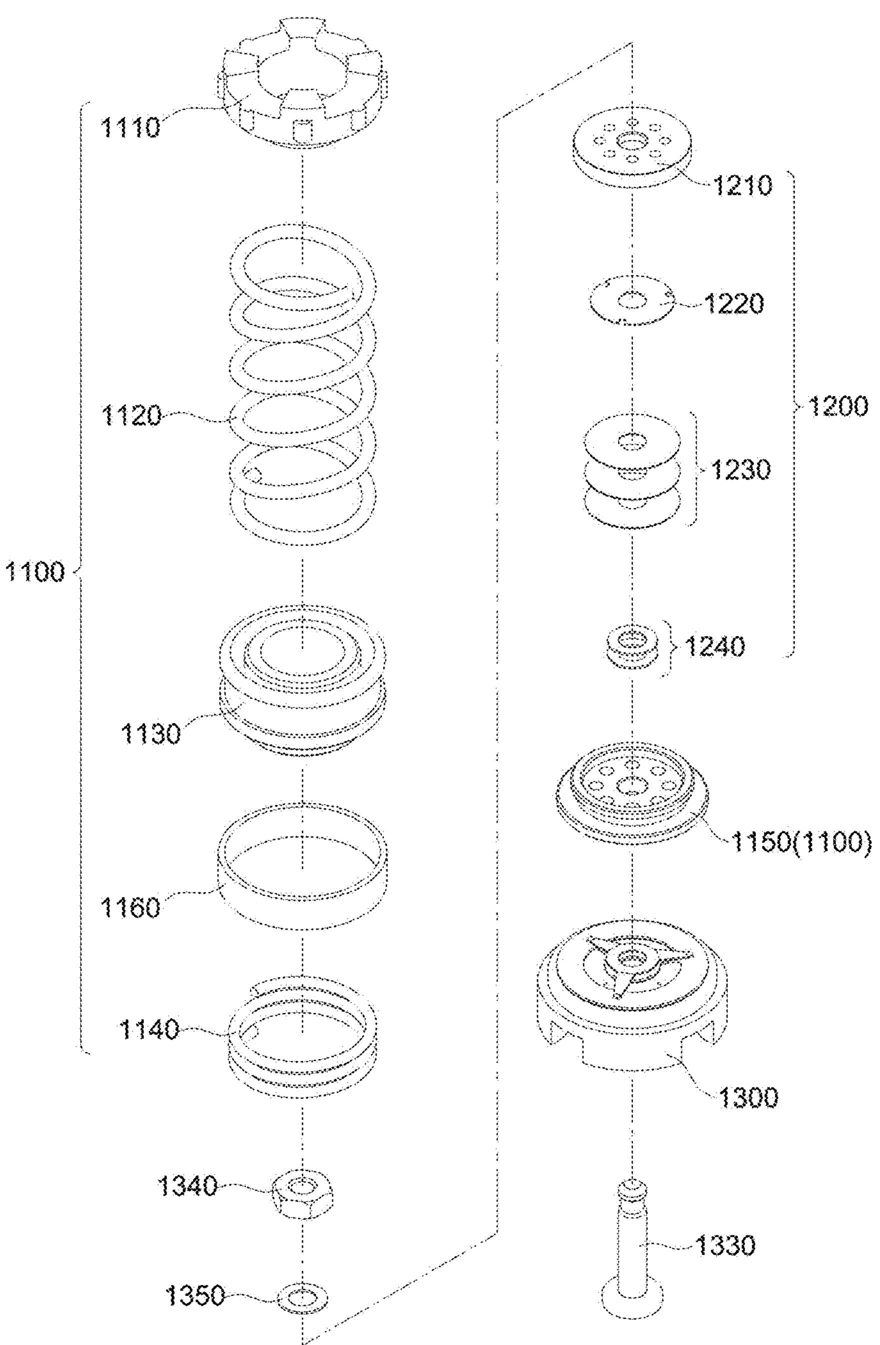
FIG. 2 is an exploded perspective view of a shock absorber according to an embodiment of the present disclosure.
Figure 3:
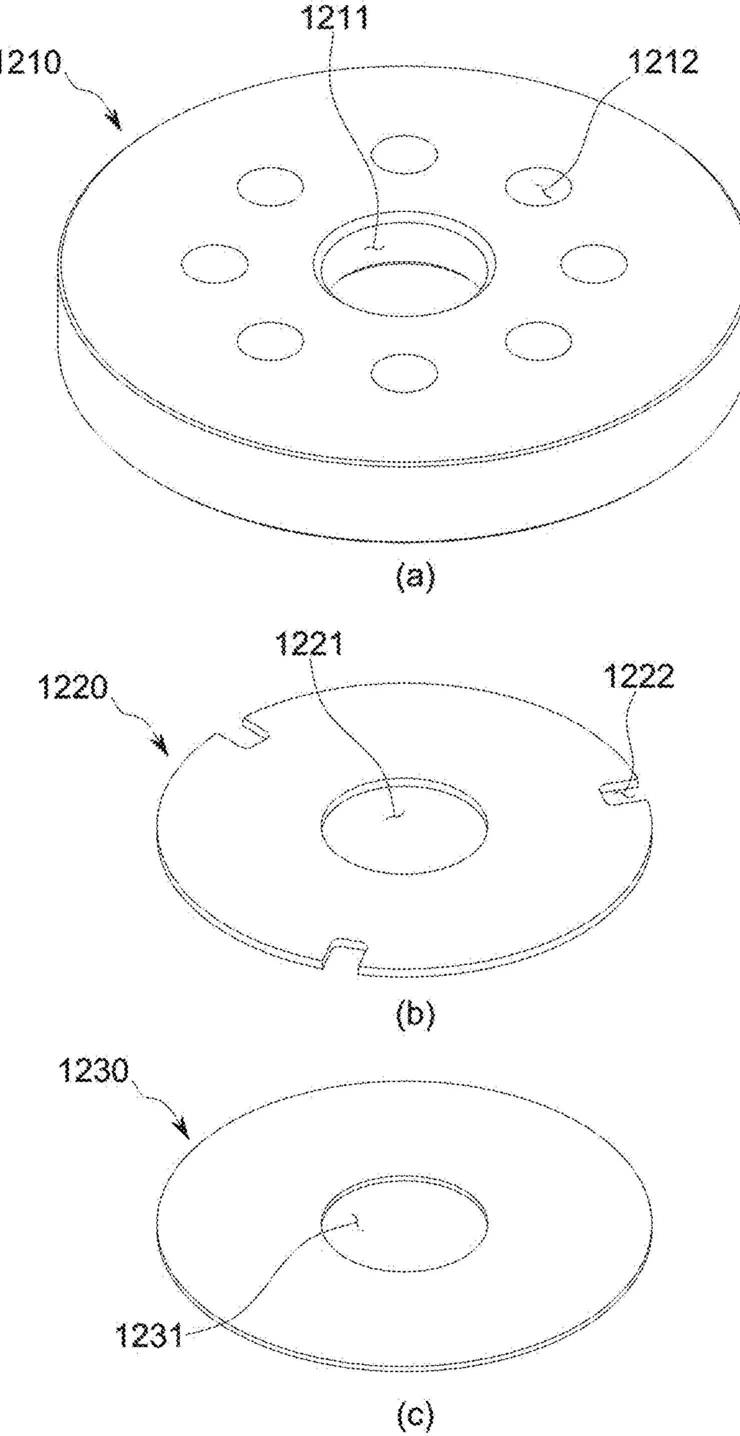
FIG. 3 is a perspective view of a disc module according to an embodiment of the present disclosure.

FIG. 1 is a cross-sectional view of a shock absorber according to a first embodiment of the present disclosure, FIG. 2 is an exploded perspective view of a shock absorber according to a first embodiment of the present disclosure, and FIG. 3 is a perspective view of a disc module according to an embodiment of the present disclosure.

As illustrated in FIGS. 1 and 2, a shock absorber 1000 may include a tube 1510, a piston valve 1400, an elastic module 1100, and a disc module 1200.

The inside of the tube 1510 is filled with a fluid, and the tube 1510 is disposed inside a shock absorber body 1500. The tube 1510 is disposed to be spaced apart from an inner surface of the shock absorber body 1500. For example, an air gap may be formed between the tube 1510 and the shock absorber body 1500. A reserve chamber 1630 is formed in a space defined by the tube 1510 and the shock absorber body 1500 spaced apart from each other.

The piston valve 1400 is disposed to be movable in first and second directions (e.g. upward and downward) in the tube 1510. The space in the tube 1510 is divided into a compression chamber 1610 and a rebound chamber 1620 by the piston valve 1400 and is variable according to a position of the piston valve 1400 in the tube 1510. The compression chamber 1610 is disposed to be closer to a lower side of the tube 1510 than the rebound chamber 1620.

The elastic module 1100 may include an upper guide member (e.g. an upper guide or an upper guide elastic) 1110, a first elastic member (e.g. a first elastic) 1120, a central guide member (e.g. a central guide or a central guide elastic) 1130, a second elastic member (e.g. a second elastic) 1140, and a lower guide member (e.g. a lower guide or a lower guide elastic) 1150.

The first and second elastic members 1120 and 1140 serve to provide a damping force by using an elastic force thereof during a compression process in which the piston valve 1400 moves in the second direction (e.g. downward). The second direction may be, for example, but not limited to, a direction toward the compression chamber 1610.

The first and second elastic members 1120 and 1140 may each be implemented as an elastic body such as a spring. An elastic modulus of each of the first and second elastic members 1120 and 1140 may be selectively set in consideration of the type of an apparatus in which the shock absorber 1000 is to be installed and a damping force and response sensitivity required to be provided by the apparatus.

During the compression process of the shock absorber 1000, the second elastic member 1140 is compressed first and then the first elastic member 1120 is compressed later. In consideration of this configuration, the first elastic member 1120 may have a larger elastic modulus than the second elastic member 1140.

The first elastic member 1120 may be disposed in a first region 1611 of the compression chamber 1610, and the second elastic member 1140 may be disposed in a second region 1612 of the compression chamber 1610. In addition, the first and second elastic members 1120 and 1140 may be disposed in series to effectively generate the damping force.

The central guide member 1130 is disposed between the first and second elastic members 1120 and 1140, and at least a part of the lower guide member 1150 is disposed below the second elastic member 1140. For example, the central guide member 1130 is disposed below the first elastic member 1120, the second elastic member 1140 is disposed below the central guide member 1130, and the lower guide member 1150 is disposed below the second elastic member 1140.

The central guide member 1130 is disposed to be movable in the first and second directions (for instance, upward and downward directions (a longitudinal direction of the tube 1510 or a movement direction of the piston valve 1400)). Since the central guide member 1130 is disposed between the first and second elastic members 1120 and 1140 and movable in the upward and downward directions, the central guide member 1130 may serve as a medium that transmits the compressive force and the damping force between the first and second elastic members 1120 and 1140.

The first and second regions 1611 and 1612 are defined by the position of the central guide member 1130 according to the first or second direction (e.g. the upward or downward direction). Since the central guide member 1130 is moved in the first or second direction (e.g. the upward or downward direction) by the movement of the piston valve 1400, volumes of the first and second regions 1611 and 1612 may be changed by the movement of the central guide member 1130.

The lower guide member 1150 is disposed below the second elastic member 1140 and supports a lower end of the second elastic member 1140. Since the lower end of the second elastic member 1140 is supported by the lower guide member 1150, the position of the second elastic member 1140 may be stably maintained.

As described above, the shock absorber 1000 according to the present disclosure includes the elastic module 1100. Therefore, during the compression process in which the first and second elastic members 1120 and 1140 are compressed, the shock absorber 1000 may use the damping force generated by the fluid stored in the compression chamber 1610 as well as the damping force generated by the first and second elastic members 1120 and 1140. Accordingly, the present disclosure may increase the damping force while maintaining the size of the shock absorber 1000 or without reducing the size of the shock absorber 1000.

In the exemplary embodiment of the present disclosure, the elastic module 1100 may further include a piston ring 1160.

The piston ring 1160 may be disposed to cover or surround a lateral surface of the central guide member 1130 and may be configured to support the upward and downward movements of the central guide member 1130. Therefore, the piston ring 1160 may have any shape corresponding to a shape of the central guide member 1130. To stably dispose the piston ring 1160 on the central guide member 1130, an accommodation groove 1165 capable of accommodating at least a part of the piston ring 1160 may be formed along the lateral surface of the central guide member 1130.

As illustrated in FIGS. 1 and 2, the disc module 1200 may include an upper retainer 1210, one or more upper discs 1220, and one or more lower discs 1230.

The upper retainer 1210 is disposed below the central guide member 1130. As illustrated in FIG. 3(*a*), one or more flow paths (e.g. an upper retainer flow paths 1212) are formed in the upper retainer 1210 or at an outer peripheral surface of the upper retainer 1210, and the fluid in the compression chamber 1610 may flow through the upper retainer flow paths 1212.

A through-hole (e.g. an upper retainer through-hole 1211) may penetrate a central portion of the upper retainer 1210 in a direction which is perpendicular to a plane of the upper retainer 1210 (for example, the first or second direction or the upward or downward direction). A body pin 1330 to be described below may be inserted or coupled to the upper retainer through-hole 1211 and stably maintain the position of the upper retainer 1210.

One or more upper discs 1220 are disposed below the upper retainer 1210. As illustrated in FIG. 3(*b*), one or more flow paths (e.g. upper disc flow paths 1222) are formed in an outer peripheral surface of the upper disc 1220. The upper disc flow paths 1222 may communicate with the upper retainer flow paths 1212 of the upper retainer 1210 and provide routes or flow paths through which the fluid is capable of flowing.

A through-hole (e.g. an upper disc through-hole 1221) may penetrate a central portion of the upper disc 1220 in a direction which is perpendicular to a plane of the upper disc 1220 (for example, the first or second direction or the upward or downward direction). The body pin 1330 to be described below may be inserted or coupled to the upper disc through-hole 1221 and stably support the position of the upper disc 1220.

One or more lower discs 1230 are disposed below the upper discs 1220. As illustrated in FIG. 3(*c*), a through-hole (e.g. a lower disc through-hole 1231) may penetrate a central portion of the lower disc 1230 in a direction which is perpendicular to a plane of the lower disc 1230 (for example, the first or second direction or the upward or downward direction). The body pin 1330 to be described below may be inserted or coupled to the lower disc through-hole 1231 and stably support the position of the lower disc 1230.

When the piston valve 1400 moves in the second direction (e.g. downward) during the compression process, the fluid stored in the first region 1611 passes through a through-hole (for example, a central guide through-hole, 1132 in FIG. 6) formed in the central guide member 1130 and flows along the routes defined by the upper retainer flow paths 1212 and the upper disc flow paths 1222. Accordingly, the hydraulic pressure can be generated by the flow of the fluid.

When the compression process is continuously performed and the piston valve 1400 further moves in the second direction (e.g. downward), the hydraulic pressure may be further increased by the flow of the fluid. When the hydraulic pressure is equal to or higher than a limit hydraulic pressure (i.e. a preset hydraulic pressure) or exceeds the limit hydraulic pressure, the internal components may be damaged or the shapes of the internal components may be changed, thereby causing deterioration in performance of a shock absorber.

To solve this problem, the upper discs 1220 and the lower discs 1230 are configured to be temporarily deformable in shape (for instance, but not limited thereto, the entirety or a part of the surface of the disc can be deformed to be tilted or curved downward) when the applied hydraulic pressure is equal to or higher than the limit hydraulic pressure or exceeds the limit hydraulic pressure.

When the upper discs 1220 and the lower discs 1230 are curved downward, a new flow path (or a bypass flow path) for the fluid, which was not formed when the upper discs

1220 and/or the lower discs 1230 were not curved in the second direction or was not present before the upper discs 1220 and the lower discs 1230 are curved, may be formed, such that the applied hydraulic pressure can be decreased to the limit hydraulic pressure or less.

The shock absorber 1000 according to the present disclosure includes the discs included in the disc module that may be temporarily deformable in shape depending on the magnitude of the applied hydraulic pressure as described above, and therefore it is possible to prevent damage to the internal components or deterioration in performance even when the hydraulic pressure equal to or higher than the limit hydraulic pressure is applied.

The limit hydraulic pressure needs to be increased to form the bypass flow path when a relatively high hydraulic pressure is applied. In contrast, the limit hydraulic pressure needs to be decreased to form the bypass flow path when a relatively low hydraulic pressure is applied.

The limit hydraulic pressure may be set depending on the number of upper discs 1220. For example, the limit hydraulic pressure increases as the number of upper discs 1220 increases, and the limit hydraulic pressure decreases as the number of upper discs 1220 decreases.

The limit hydraulic pressure may also be set depending on the number of lower discs 1230. For example, the limit hydraulic pressure increases as the number of lower discs 1230 increases, and the limit hydraulic pressure decreases as the number of lower discs 1230 decreases.

Additionally, the limit hydraulic pressure may be set depending on both the number of upper discs 1220 and the number of lower discs 1230. For example, the limit hydraulic pressure increases as the number of upper discs 1220 and the number of lower discs 1230 are increased, and the limit hydraulic pressure decreases as the number of upper discs 1220 and the number of lower discs 1230 are decreased.

Meanwhile, to deform or curve the upper discs 1220 and the lower discs 1230 in the second direction (e.g. downward), a space for deforming or curving the upper discs 1220 and/or the lower discs 1230 is required. The space for the deformation or curve may be formed by arranging a part of the surface (such as an outer peripheral surface) of the lower disc 1230 to be spaced apart from an upper surface of the lower guide member 1150.

For instance, two exemplary structures may be considered to form the space for deforming or curving the upper discs 1220 and/or the lower discs 1230.

The first exemplary structure is a structure extending upward from a central portion of the upper surface of the lower guide member 1150 and configured to support a periphery of the lower disc through-hole 1231. The second exemplary structure is configured by one or more separate members (e.g. one or more lower retainers 1240) that allow the lower discs 1230 to be spaced apart from the lower guide member 1150.

The lower retainers 1240 are disposed between the lower discs 1230 and the lower guide member 1150 to allow the lower discs 1230 and the lower guide member 1150 to be spaced apart from one another, thereby ensuring the space for the deformation or curve defined by the lower retainers 1240.

A length (or height) of the space for the deformation or curve based on the first or second direction (e.g. an upward or downward direction), which determines a size of the bypass flow path (or degrees to which the upper discs and the lower discs can be curved), is determined depending on the number of lower retainers 1240.

For example, when a relatively large number of lower retainers 1240 are disposed between the lower discs 1230 and the lower guide member 1150, the height of the curved space is relatively large, and the upper discs 1220 and the lower discs 1230 can be deformed or curved largely, such that a relatively large bypass flow path can be formed.

As another example, when a relatively small number of lower retainers 1240 are disposed between the lower discs 1230 and the lower guide member 1150, the height of the curved space is relatively small, the upper discs 1220 and the lower discs 1230 can be deformed or curved slightly, such that a relatively small bypass flow path can be formed.

The number of lower retainers 1240 may vary depending on the size of the bypass flow path (e.g., the height of the space for the deformation or curve) intended to be formed, a size of the shock absorber 1000, and a size of a space for mounting the shock absorber 1000 in an apparatus in which the shock absorber 1000 is mounted.

Hereinafter, the lower guide member 1150, a body valve 1300, the central guide member 1130, and an upper guide member 1110 will be described in detail with reference to FIGS. 4 to 7.

Figure 4:
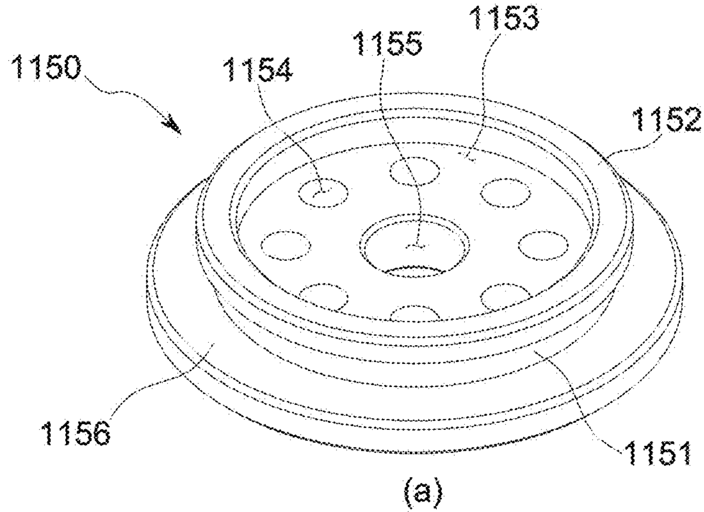
FIG. 4 is a perspective view of a lower guide member according to an embodiment of the present disclosure.
Figure 4:
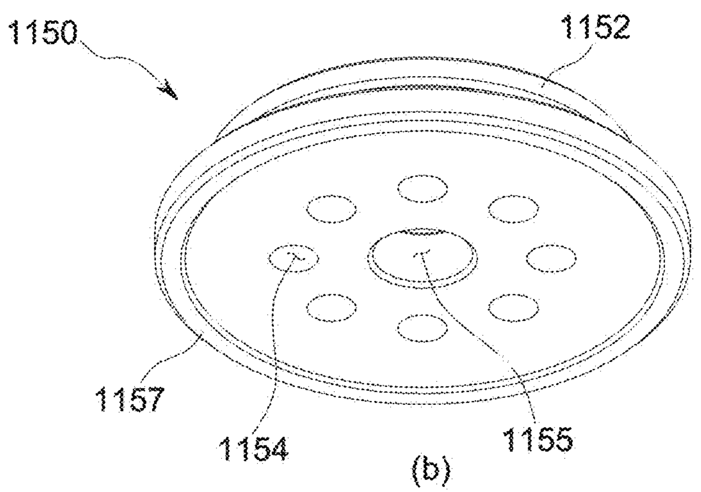

As illustrated in FIG. 4, the lower guide member 1150 may include a lower guide body 1151 and a first lower guide support part 1152.

A through-hole (e.g. a lower guide through-hole 1155) is formed in a central portion of the lower guide body 1151 in a first or second direction (e.g. a upward or downward direction), and the first lower guide support part 1152 extends in the first direction (e.g. upward) along an outer peripheral surface of the lower guide member 1150. The first lower guide support part 1152 may be in contact with a lower side of the upper retainer 1210 and stably support the upper retainer 1210.

A groove portion (e.g. a lower guide groove portion 1153) is formed in a portion (for example, a central portion) of the upper side of the lower guide member 1150 where the first lower guide support part 1152 is not formed. The upper discs 1220 and the lower discs 1230 are mounted in a space defined by the lower guide groove portion 1153, such that the positions of the upper discs 1220 and the lower discs 1230 can be stably maintained.

One or more flow paths (e.g. lower guide flow paths 1154) may be formed in an outer peripheral surface of the lower guide groove portion 1153 and penetrate the lower guide member 1150 in the first or second direction (e.g. the upward or downward direction).

The lower guide flow paths 1154 communicate with the upper disc flow paths 1222 in a state in which the upper discs 1220 and the lower discs 1230 are not deformed or curved. The lower guide flow paths 1154 communicate with the bypass flow path in a state in which the upper discs 1220 and the lower discs 1230 are deformed or curved.

In an exemplary embodiment, the lower guide member 1150 may further include a second lower guide support part 1156 extending from a lateral surface of the lower guide body 1151. The lower end of the second elastic member 1140 may be in contact with the second lower guide support part 1156, and the second lower guide support part 1156 may support the lower end of the second elastic member 1140.

Meanwhile, the shock absorber 1000 may further include the body valve 1300 disposed below the lower guide member 1150. The body valve 1300 is configured to adjust the amount by which the fluid in the compression chamber 1610 flows to the reserve chamber 1630.

Figure 5:
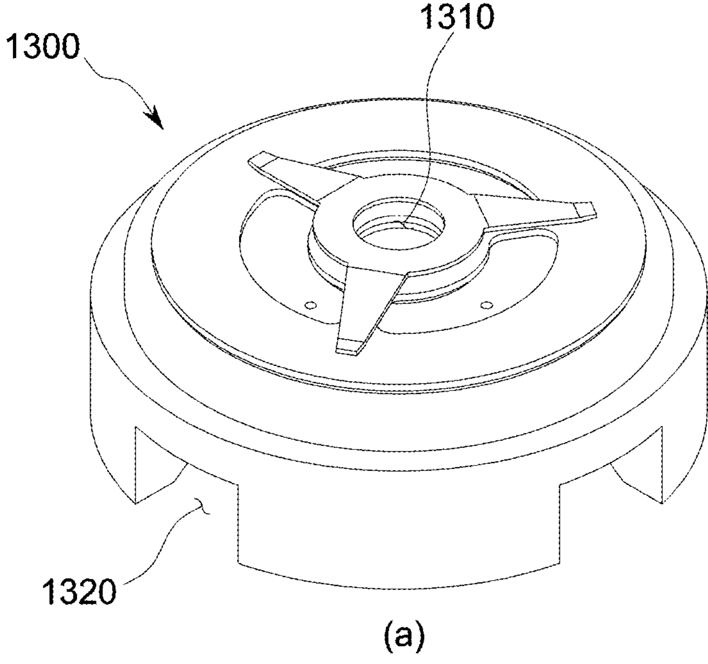
FIG. 5 is a perspective view of a body valve according to an embodiment of the present disclosure.
Figure 5:
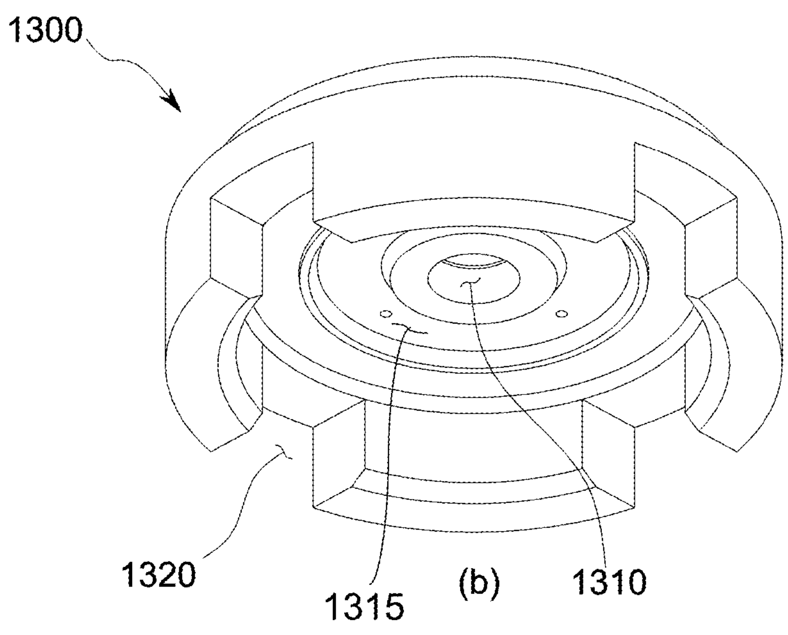

As illustrated in FIG. 5, a through-hole (e.g. a body valve through-hole 1310) is formed in a central portion of the body valve 1300, and one or more flow paths (e.g. body valve flow paths 1315) are formed along a periphery of the body valve through-hole 1310. In addition, one or more discharge grooves (e.g. body valve discharge grooves 1320) are formed in a surface extending downward along an outer peripheral surface of the body valve 1300.

The body valve flow paths 1315 and the body valve discharge grooves 1320 communicate with one another, such that the fluid in the compression chamber 1610 can flow to the reserve chamber 1630 through the body valve flow paths 1315 and the body valve discharge grooves 1320.

A lower guide projection portion 1157 may protrude downward from a lower side of the lower guide member 1150. The lower guide projection portion 1157 is in contact with an upper side of the body valve 1300. Therefore, by forming the lower guide projection portion 1157 on the lower side of the lower guide member 1150, a gap between the body valve 1300 and the lower guide member 1150 may be effectively supported without an additional or separate fixing member between the body valve 1300 and the lower guide member 1150.

Meanwhile, the shock absorber 1000 may further include the body pin 1330 and a nut 1340.

A head portion having a relatively large diameter is formed at a lower side of the body pin 1330, and a body portion having a relatively small diameter is formed at an upper side of the body pin 1330. The body portion of the body pin 1330 has a diameter so that the body portion of the body pin 1330 may be inserted into the body valve through-hole 1310, the lower guide through-hole 1155, the lower disc through-hole 1231, the upper disc through-hole 1221, and the upper retainer through-hole 1211.

The body portion of the body pin 1330 sequentially penetrates the body valve through-hole 1310, the lower guide through-hole 1155, the lower disc through-hole 1231, the upper disc through-hole 1221, and the upper retainer through-hole 1211. The nut 1340 is coupled to a threaded portion formed at the upper side of the body portion of the body pin 1330, such that the body pin 1330 can be fixed.

Accordingly, the body valve through-hole 1310, the lower guide through-hole 1155, the lower disc through-hole 1231, the upper disc through-hole 1221, and the upper retainer through-hole 1211 may be coaxially and compactly coupled by the coupling structure of them and the body pin 1330 described above, such that the coupling therebetween may be stably maintained.

In an exemplary embodiment, the shock absorber 1000 may further include a washer 1350 disposed between the nut 1340 and the upper retainer 1210. The washer 1350 is coupled to the body pin 1330 through a through-hole formed in a central portion of the washer 1350, such that the coupling between the body pin 1330 and the nut 1340 can be supported, and may be prevented from being released by vibration.

Figure 6:
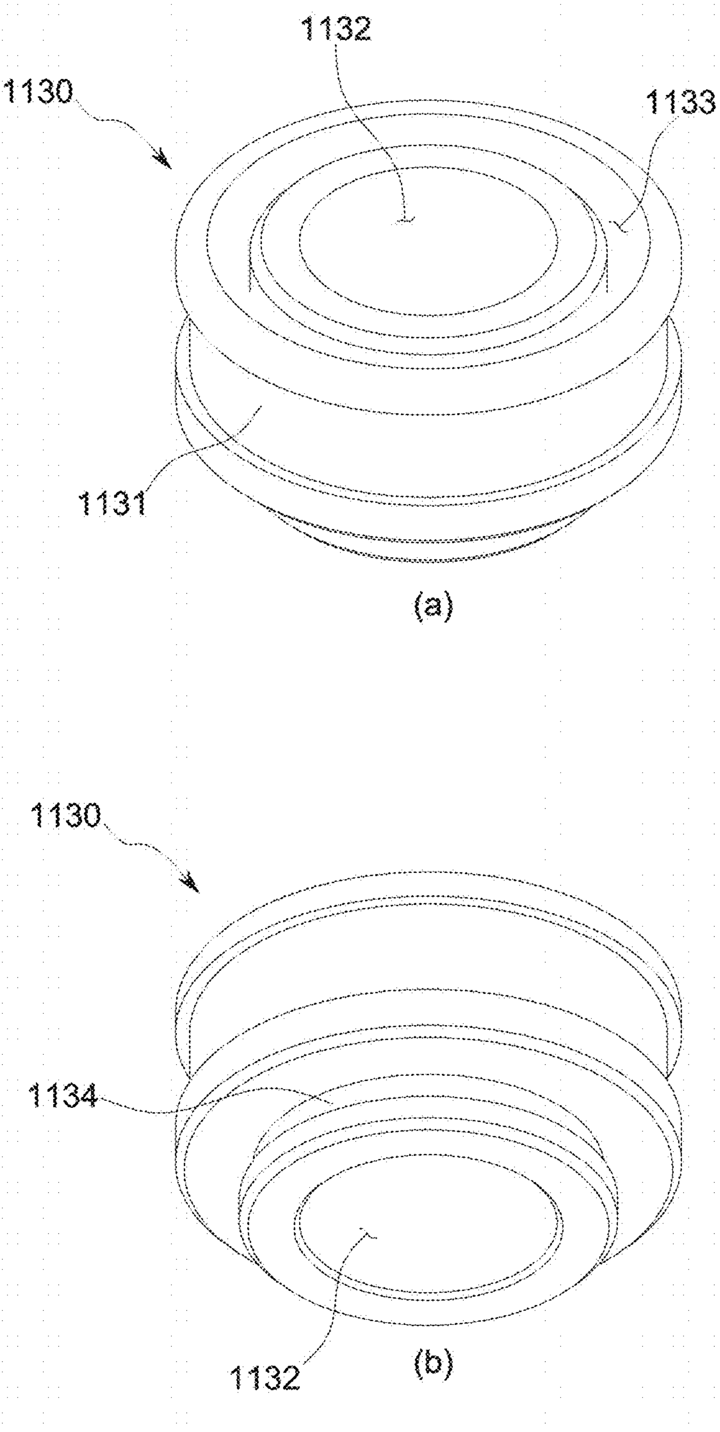
FIG. 6 is a perspective view of a central guide member according to an embodiment of the present disclosure.

As illustrated in FIG. 6, the central guide member 1130 may include a central guide body 1131, a first central guide support part 1133, and a second central guide support part 1134.

A through-hole (e.g. a central guide through-hole 1132) is formed in the central guide body 1131 in the first or second direction (e.g. the upward or downward direction). The fluid may flow between the first and second regions 1611 and 1612 through the central guide through-hole 1132.

The first central guide support part 1133 is concavely formed along an upper outer peripheral surface of the central guide body 1131. A lower portion of the first elastic member 1120 is mounted on the first central guide support part 1133, such that the position of the first elastic member 1120 can be stably supported by the first central guide support part 1133.

The second central guide support part 1134 protrudes from a lower portion of the central guide body 1131. The second central guide support part 1134 is inserted into a part of an upper side of the second elastic member 1140, such that the position of the second elastic member 1140 can be stably supported by the second central guide support part 1134.

The elastic module 1100 may further include the upper guide member 1110 disposed between the piston valve 1400 and the first elastic member 1120, and the elastic module 1100 is movable in the first and second direction (e.g. the upward the downward direction) by the movement of the piston valve 1400.

Figure 7:
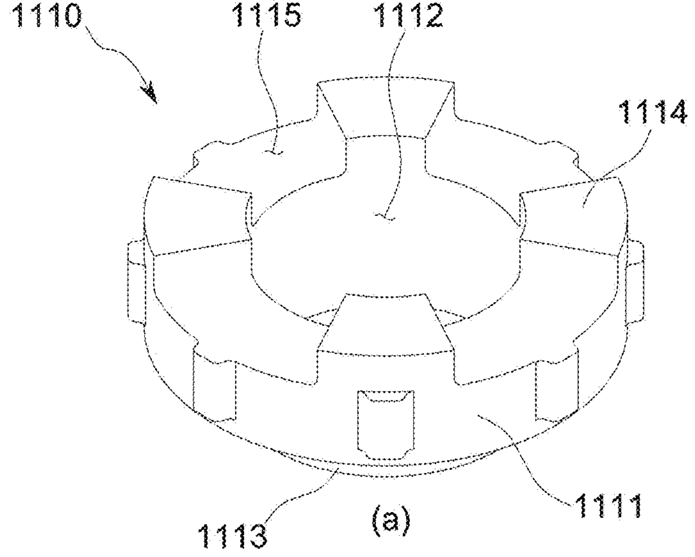
FIG. 7 is a perspective view of an upper guide member according to an embodiment of the present disclosure.
Figure 7:
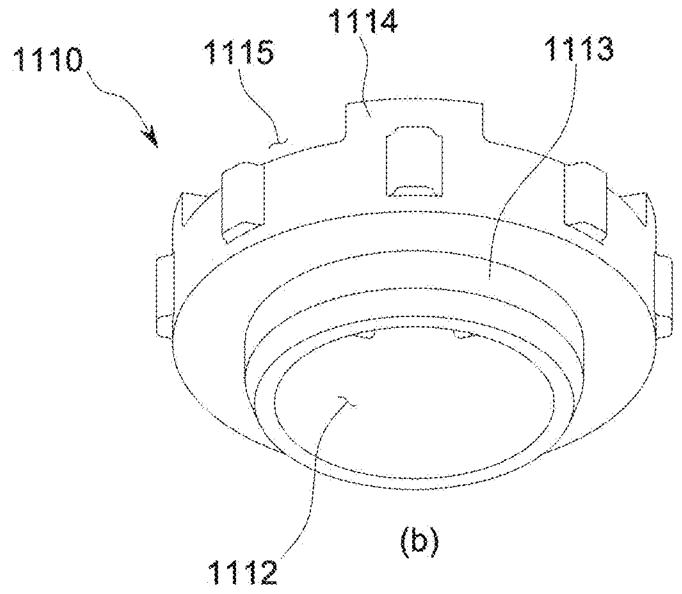

As illustrated in FIG. 7, the upper guide member 1110 may include an upper guide body 1111, an upper guide support part 1113, and one or more protrusions (e.g. one or more upper guide protrusions 1114).

A through-hole (e.g. an upper guide through-hole 1112) is formed in the upper guide body 1111 in the first or second direction (e.g. the upward or downward direction), and a part of a lower portion of a piston rod 1410 can be inserted into the upper guide through-hole 1112 of the upper guide through-hole 1112 depending on the movement of the piston valve 1400 or the upper guide body 1111. Therefore, unnecessary leftward and rightward motions of the piston rod 1410 can be limited or restricted, such that the upward and downward movements of the piston valve 1400 may be stably performed.

The upper guide support part 1113 of the upper guide member 1110 protrudes along a lower outer peripheral surface of the upper guide body 1111. The upper guide support part 1113 is inserted into a part of an upper side of the first elastic member 1120, such that the position of the first elastic member 1120 may be stably supported by the upper guide support part 1113.

The upper guide protrusions 1114 of the upper guide member 1110 protrude along an upper outer peripheral surface of the upper guide body 1111 and are spaced apart from one another. During the compression process, the upper guide protrusions 1114 may come into contact with the piston valve 1400, and thus the downward movement of the piston valve 1400 is transmitted to the other components positioned below the piston valve 1400.

Flow paths (e.g. upper guide flow paths 1115) are formed on the upper outer peripheral surface of the upper guide body 1111 and at positions at which the upper guide protrusion 1114 is not formed. The upper guide flow paths 1115 communicate with a flow path (not illustrated) formed in the piston valve 1400. Therefore, the fluid in the first region 1611 may flow to the outside of the compression chamber 1610, e.g., to the rebound chamber 1620 through the upper guide flow paths 1115 and the flow path formed in the piston valve 1400.

Hereinafter, a process of providing damping force and a process of forming a bypass route during a compression process will be described in detail with reference to FIGS. 8 to 10.

Figure 8:
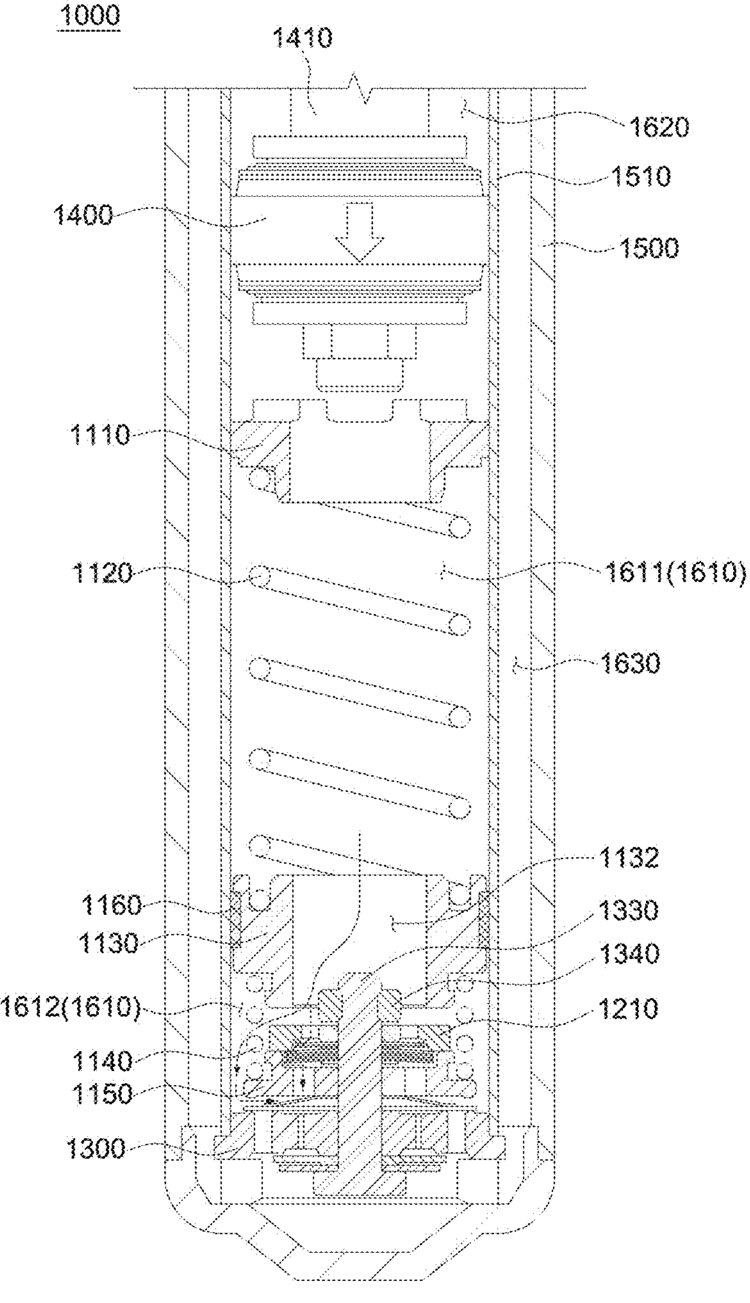
FIGS. 8 to 10 are cross-sectional views of a shock absorber for illustrating a compression process of the shock absorber according to an embodiment of the present disclosure.
Figure 9:
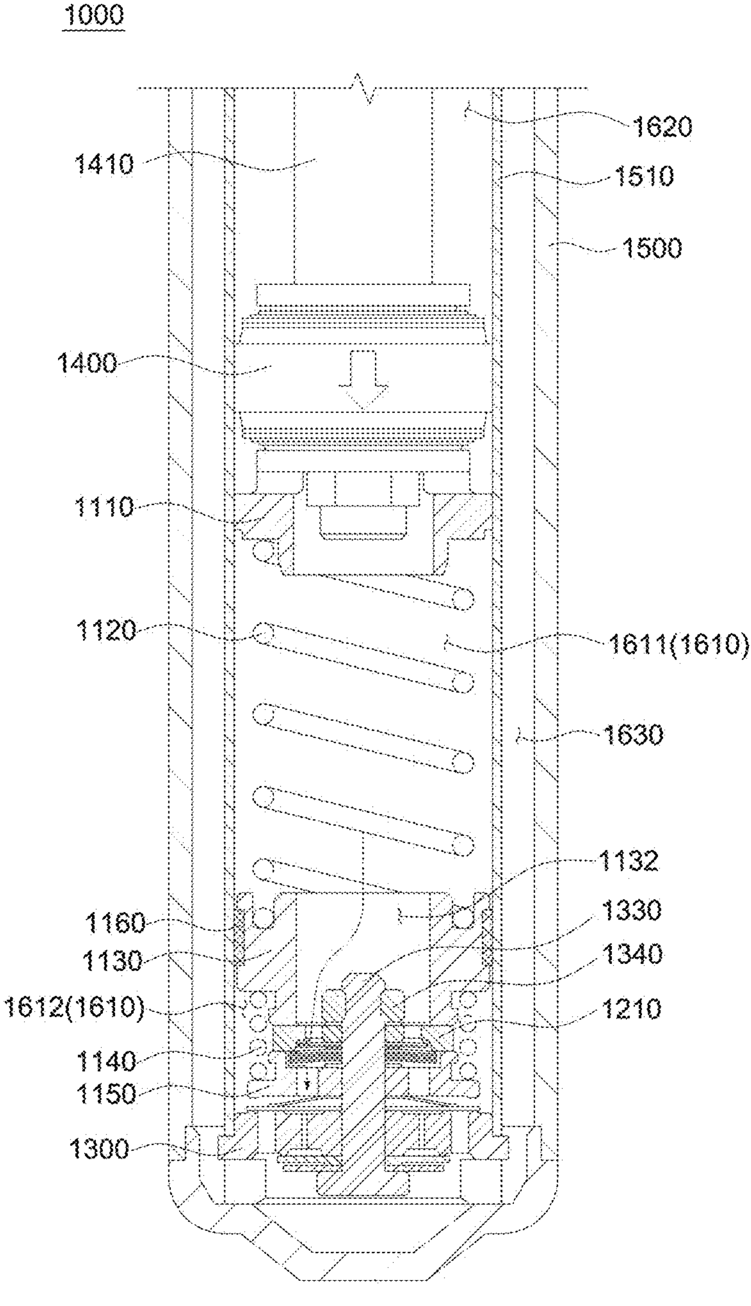

As illustrated in FIG. 8, when the compression process is initiated, the piston valve 1400 moves in a second direction (e.g. downward) in which the piston valve 1400 presses the first and second elastic members 1120 and 1140. When a stroke of the piston valve 1400 is equal to or greater than a predetermined stroke, the piston valve 1400 comes into contact with the upper guide member 1110.

Since the elastic modulus of the first elastic member 1120 is larger than the elastic modulus of the second elastic member 1140, the compression of the second elastic member 1140 is initiated first after the piston valve 1400 comes into contact with the upper guide member 1110.

In this case, after the fluid in the compression chamber 1610 passes through the central guide through-hole 1132 of the central guide body 1131, the fluid flows to the reserve chamber 1630 along 'a first route passing through the space between the lower guide member 1150 and the body valve 1300' and 'a second route sequentially passing through the upper retainer 1210, the upper disc flow path 1222, and the lower guide flow path 1154'.

When the compression process is continuously performed, the first elastic member 1120 begins to be compressed. As the first elastic member 1120 is compressed, the central guide member 1130 comes into contact with the upper retainer 1210, as illustrated in FIG. 9.

Figure 10:
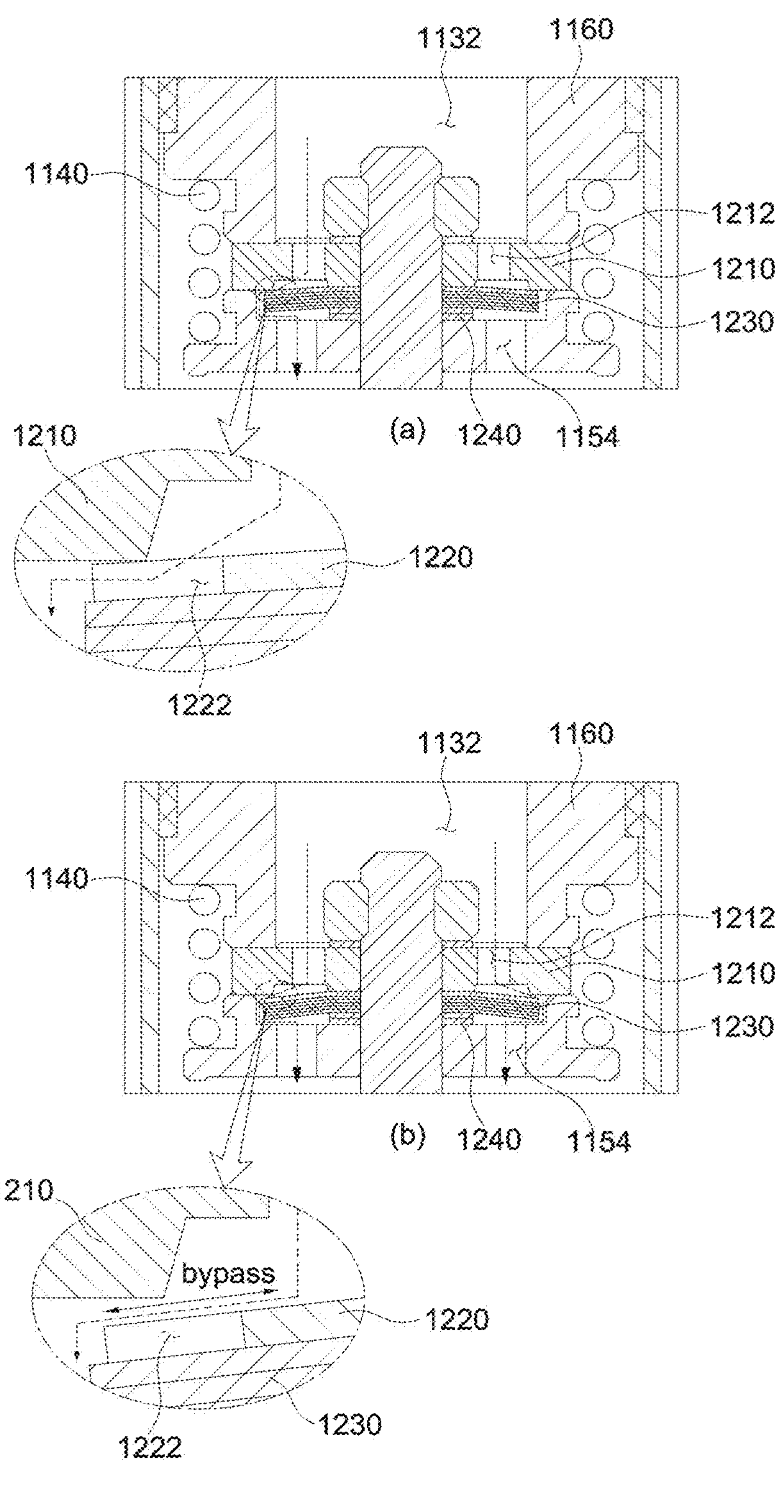

In this case, 'the first route passing through the space between the lower guide member 1150 and the body valve 1300' is blocked, and the fluid in the compression chamber 1610 passes through the central guide through-hole 1132 and then flows to the reserve chamber 1630 along 'the second route (see FIG. 10(*a*)) sequentially passing through the upper retainer 1210, the upper disc flow path 1222, and the lower guide flow path 1154'. The hydraulic pressure can be generated by the flow of the fluid.

When the compression process is additionally performed continuously, the fluid in the chamber (first region), which is formed so that the first elastic member 1120 is disposed therein, is discharged through the upper guide flow paths 1115 and the upper disc flow paths 1222 (see FIG. 10(*a*)), such that the hydraulic pressure can be generated. In this case, the damping force is applied by the elastic force of the first elastic member 1120.

When the hydraulic pressure further increases and becomes equal to or higher than the limit hydraulic pressure or exceeds the limit hydraulic pressure (when the applied hydraulic pressure is equal to or higher than the limit hydraulic pressure or exceeds the limit hydraulic pressure), the bypass flow path is formed as the upper discs 1220 and the lower discs 1230 are deformed or curved or bent downward, as illustrated in FIG. 10(*b*).

In this case, the fluid is discharged through 'a third route sequentially passing through the upper retainer 1210, the bypass flow path illustrated in FIG. 10(*b*), and the lower guide flow path 1154', such that the hydraulic pressure, which has been equal to or higher than the limit hydraulic pressure or exceeded the limit hydraulic pressure, can decrease.

Embodiment 2

Embodiment 2 relates to a shock absorber 2000 in which discs are configured to be curved downward and disposed in two stages including first and second stages, such that hydraulic pressure having a predetermined magnitude can be generated even though the discs in the first stage are curved downward.

Figure 11:
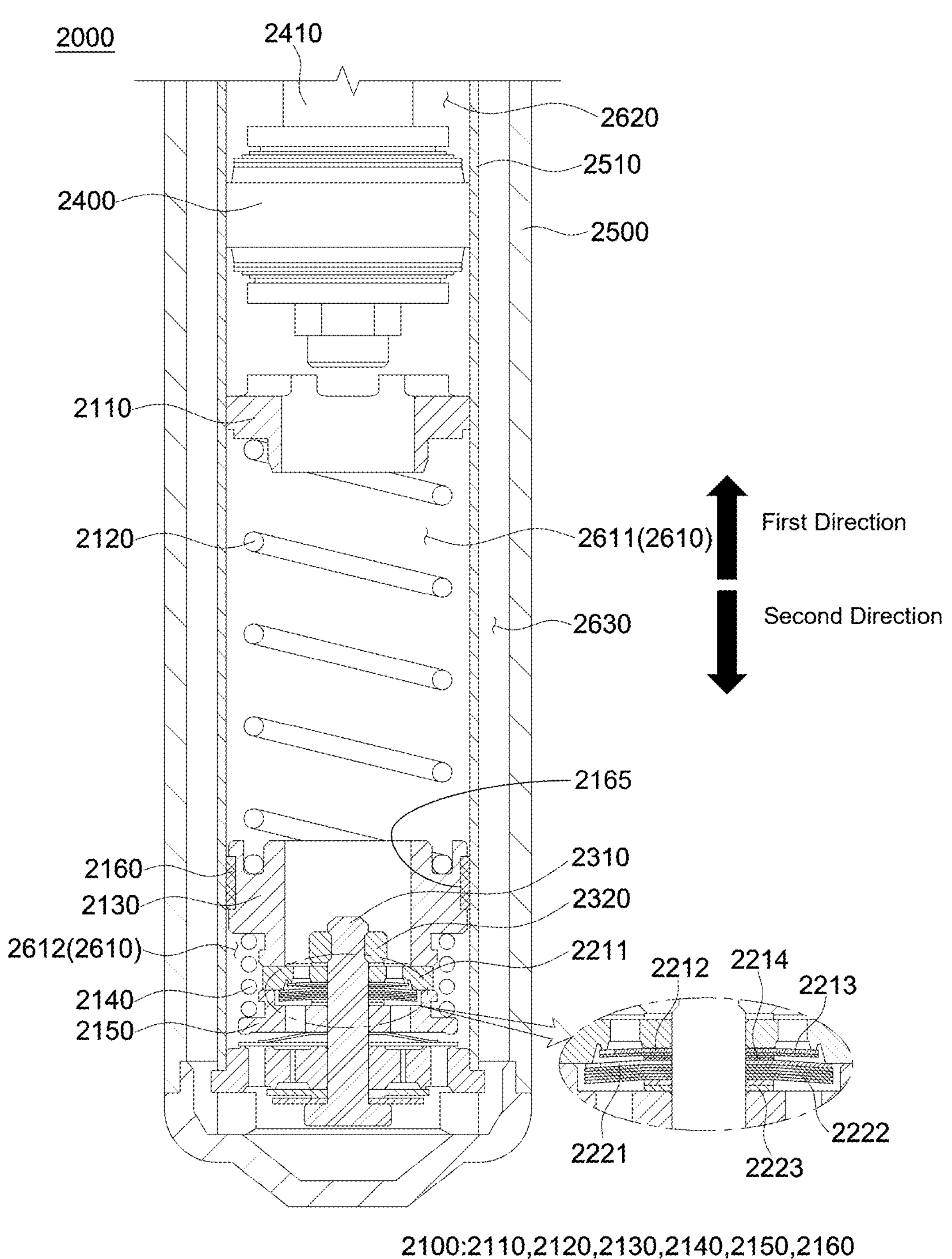
FIG. 11 is a cross-sectional view of a shock absorber according to another embodiment of the present disclosure.
Figure 12:
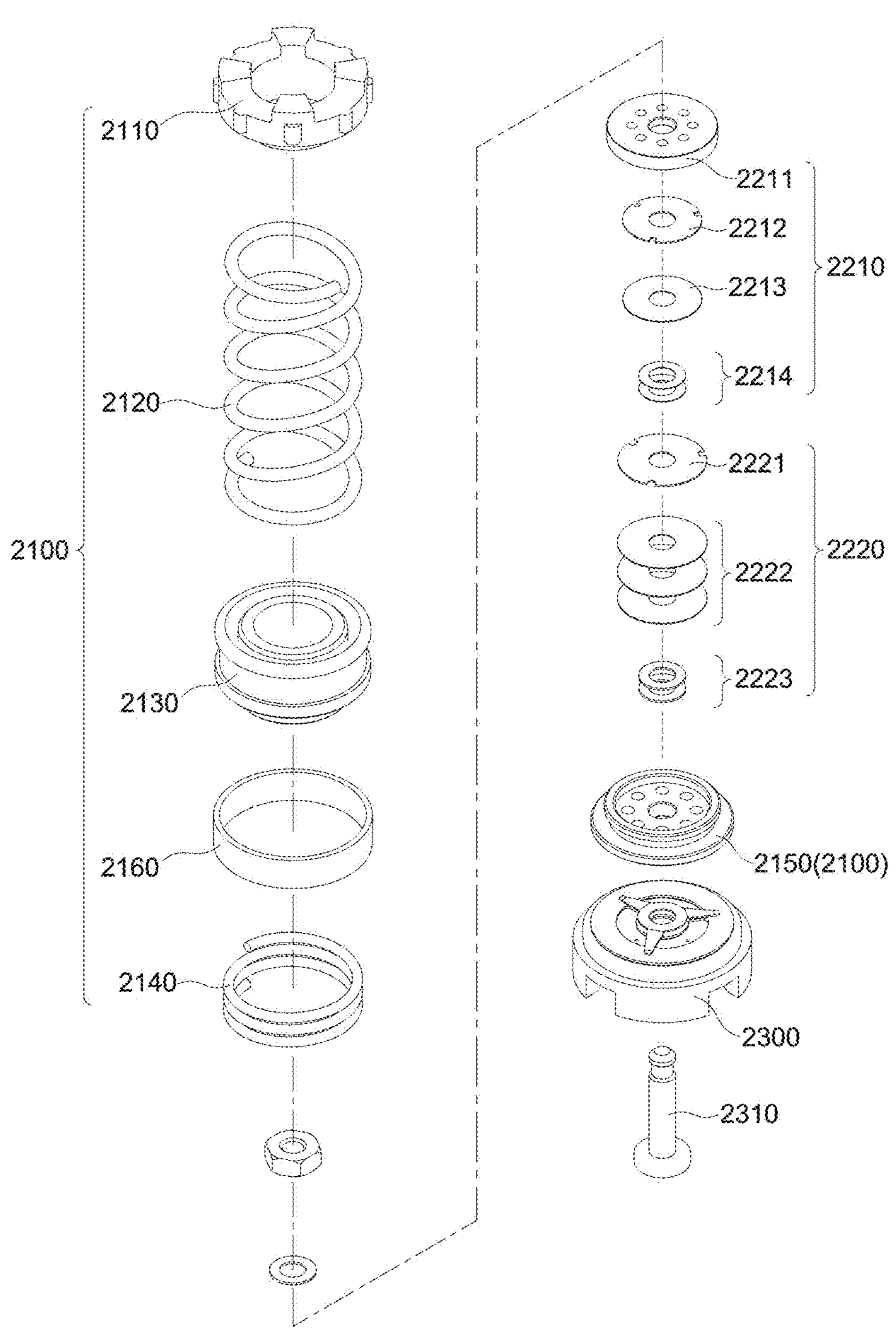
FIG. 12 is an exploded perspective view of a shock absorber according to another embodiment of the present disclosure.
Figure 13:
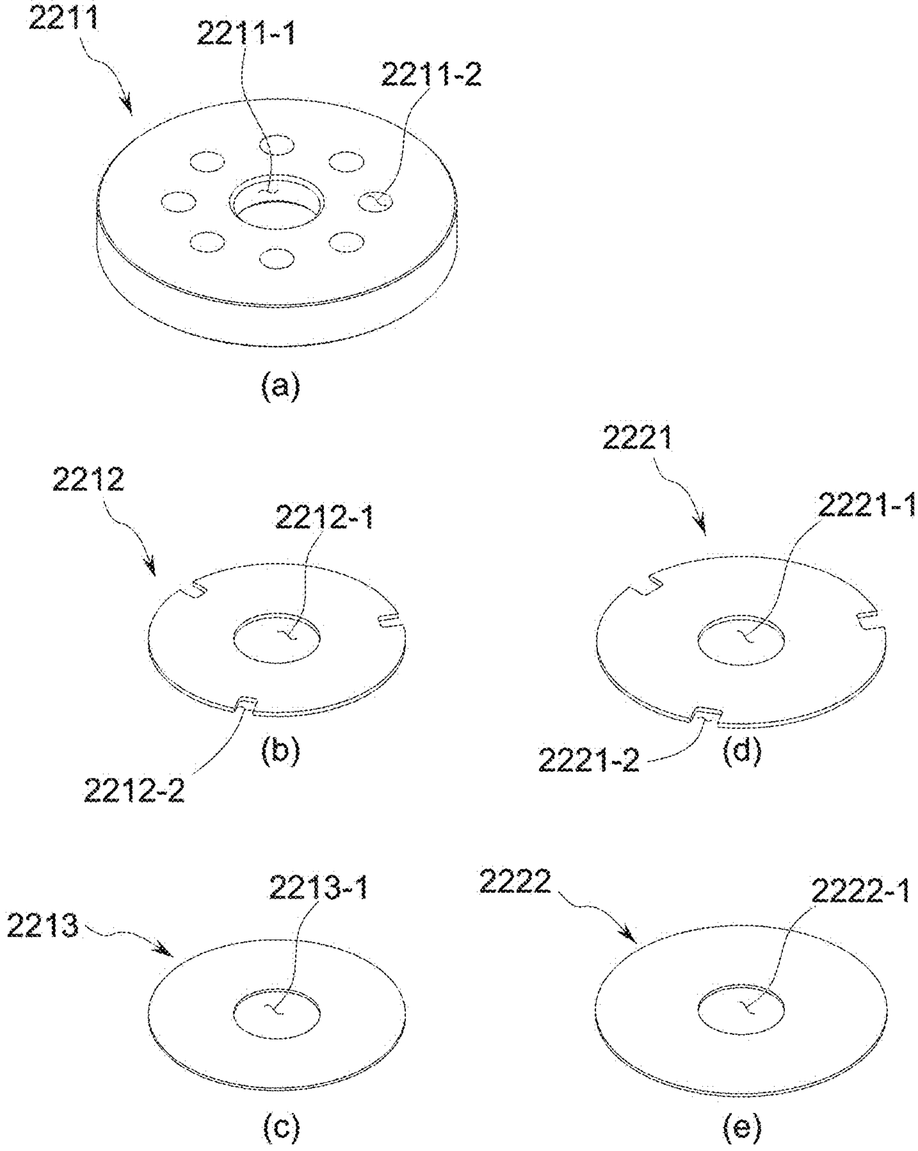
FIG. 13 is an exploded perspective view of disc modules according to another embodiment of the present disclosure.

FIG. 11 is a cross-sectional view of a shock absorber according to Embodiment 2 of the present disclosure, FIG. 12 is an exploded perspective view of a shock absorber according to Embodiment 2 of the present disclosure, and FIG. 13 is a perspective view of a disc module according to Embodiment 2 of the present disclosure.

As illustrated in FIGS. 1I and 12, the shock absorber 2000 may include a tube 2510, a piston valve 2400, an elastic module 2100, and a disc module 2200.

The inside of the tube 2510 is filled with a fluid, and the tube 2510 is disposed inside a shock absorber body 2500. The tube 2510 is disposed to be spaced apart from an inner surface of the shock absorber body 2500. For example, an air gap may be formed between the tube 2510 and the shock absorber body 2500. A reserve chamber 2630 is formed in a space defined by the tube 2510 and the shock absorber body 2500 spaced apart from each other.

The piston valve 2400 is disposed to be movable in first and second directions (e.g. upward and downward) in the tube 2510. The space in the tube 2510 is divided into a compression chamber 2610 and a rebound chamber 2620 by the piston valve 2400 and is variable according to a position of the piston valve 2400 in the tube 2510. The compression chamber 2610 is disposed to be closer to a lower side of the tube 2510 than is the rebound chamber 2620.

The elastic module 2100 may include a first elastic member (e.g. first elastic) 2120, a central guide member (e.g. a central guide or a central guide elastic) 2130, a second elastic member (e.g. a second elastic) 2140, and a lower guide member (e.g. a lower guide or a lower guide elastic) 2150.

The first and second elastic members 2120 and 2140 serve to provide a damping force by using an elastic force thereof during a compression process in which the piston valve 2400 moves in the second direction (e.g. downward). The second direction may be, for example, but not limited to, a direction toward the compression chamber 2610.

The first and second elastic members 2120 and 2140 may each be implemented as an elastic body such as a spring. An elastic modulus of each of the first and second elastic members 2120 and 2140 may be selectively set in consideration of the type of an apparatus in which the shock absorber 2000 is to be installed and a damping force and response sensitivity required to be provided by the apparatus.

During the compression process of the shock absorber 2000, the second elastic member 2140 is compressed first and then the first elastic member 2120 is compressed later. In consideration of this configuration, the first elastic member 2120 may have a larger elastic modulus than the second elastic member 2140.

The first elastic member 2120 may be disposed in a first region 2611 of the compression chamber 2610, and the second elastic member 2140 may be disposed in a second region 2612 of the compression chamber 2610. In addition, the first and second elastic members 2120 and 2140 may be disposed in series to effectively generate the damping force.

The central guide member 2130 is disposed between the first and second elastic members 2120 and 2140, and at least a part of the lower guide member 2150 is disposed below the second elastic member 2140. For example, the central guide member 2130 is disposed below the first elastic member 2120, the second elastic member 2140 is disposed below the central guide member 2130, and the lower guide member 2150 is disposed below the second elastic member 2140.

The central guide member 2130 is disposed to be movable in the first and second directions (For instance, upward and downward directions). Since the central guide member 2130 is disposed between the first and second elastic members 2120 and 2140 and movable in the upward and downward directions, the central guide member 2130 may serve as a medium that transmits the compressive force and the damping force between the first and second elastic members 2120 and 2140.

The first and second regions 2611 and 2612 are defined by the position of the central guide member 2130 according to the first or second direction (e.g. the upward or downward direction). Since the central guide member 2130 is moved in the first or second direction (the upward or downward direction) by the movement of the piston valve 2400, volumes of the first and second regions 2611 and 2612 may be changed by the movement of the central guide member 2130.

The lower guide member 2150 is disposed below the second elastic member 2140 and supports a lower end of the second elastic member 2140. Since the lower end of the second elastic member 2140 is supported by the lower guide member 2150, the position of the second elastic member 2140 may be stably maintained.

As described above, the shock absorber 2000 according to the present disclosure includes the elastic module 2100. Therefore, during the compression process in which the first and second elastic members 2120 and 2140 are compressed, the shock absorber 2000 may use the damping force generated by the fluid stored in the compression chamber 2610 as well as the damping force generated by the first and second elastic members 2120 and 2140. Accordingly, some exemplary embodiments of the present disclosure may increase the damping force while maintaining the size of the shock absorber 2000 or without reducing the size of the shock absorber 2000.

In the exemplary embodiment of the present disclosure, the elastic module 2100 may further include a piston ring 2160.

The piston ring 2160 may be disposed to cover or surround a lateral surface of the central guide member 2130 and may be configured to support the upward and downward movements of the central guide member 2130. Therefore, the piston ring 2160 may have a shape corresponding to a shape of the central guide member 2130. To stably dispose the piston ring 2160 on the central guide member 2130, an accommodation groove 2165 capable of accommodating at least a part of the piston ring 2160 may be formed along the lateral surface of the central guide member 2130.

As illustrated in FIGS. 11 and 12, the disc module 2200 may include a first disc module 2210 and a second disc module 2220. That is, the disc module 2200 may include the plurality of discs disposed in the two stages or functionally divided into two disc modules.

The first disc module 2210 may include an upper retainer 2211, one or more first upper discs 2212, and one or more first lower discs 2213.

The upper retainer 2211 is disposed below the central guide member 2130. As illustrated in FIG. 13(*a*), one or more flow paths (e.g. an upper retainer flow paths 2211-2) are formed in an outer peripheral surface of the upper retainer 2211, and the fluid in the compression chamber 2610 may flow through the upper retainer flow paths 2211-2.

A through-hole (e.g. an upper retainer through-hole 2211-1) may penetrate a central portion of the upper retainer 2211 in a direction which is perpendicular to a plane of the upper retainer 2211 (for example, the first or second direction or the upward or downward direction). A body pin 2310 to be described below may be inserted or coupled to the upper retainer through-hole 2211-1 and stably fix the position of the upper retainer 2211.

One or more first upper discs 2212 are disposed below the upper retainer 2211. As illustrated in FIG. 13(*b*), one or more flow paths (e.g. first upper disc flow paths 2212-2) are formed in an outer peripheral surface of the first upper disc 2212. The first upper disc flow paths 2212-2 may communicate with the first upper retainer flow paths 2211-2 of the upper retainer 2211 and provide routes through which the fluid is capable of flowing.

A through-hole (e.g. a first upper disc through-hole 2212-1) may penetrate a central portion of the first upper disc 2212 in a direction which is perpendicular to a plane of the first upper disc 2212 (for example, the first or second direction or the upward or downward direction). The body pin 2310 to be described below may be inserted or coupled to the first upper disc through-hole 2212-1 and stably support the position of the first upper disc 2212.

One or more first lower discs 2213 are disposed below the first upper discs 2212. As illustrated in FIG. 13(*c*), a through-hole (e.g. first lower disc through-hole 2213-1) may penetrate a central portion of the first lower disc 2213 in a direction which is perpendicular to a plane of the first lower disc 2213 (for example, the first or second direction or the upward or downward direction). The body pin 2310 to be described below may be coupled to the first lower disc through-hole 2213-1 and stably fix and support the position of the first lower disc 2213.

The second disc module 2220 may include one or more second upper discs 2221 and one or more second lower discs 2222.

The second upper discs 2221 are disposed below the first lower discs 2213. As illustrated in FIG. 13(*d*), one or more flow paths (e.g. second upper disc flow paths 2221-2) are formed in an outer peripheral surface of the second upper disc 2221. The second upper disc flow paths 2221-2 may communicate with the first upper disc flow paths 2212-2 and provide routes or flow paths through which the fluid is capable of flowing.

A through-hole (e.g. a second upper disc through-hole 2221-1) may penetrate a central portion of the second upper disc 2221 in the first or second direction (e.g. the upward or downward direction). The body pin 2310 to be described below may be inserted or coupled to the second upper disc through-hole 2221-1 and stably support the position of the second upper disc 2221-1.

The second lower discs 2222 are disposed below the second upper discs 2221. As illustrated in FIG. 13(*e*), a through-hole (e.g. a second lower disc through-hole 2222-1) may penetrate a central portion of the second lower disc 2222 in the first or second direction (e.g. the upward/downward direction). The body pin 2310 to be described below may be coupled to the second lower disc through-hole 2222-1 and stably support the position of the second lower disc 2222.

When the piston valve 2400 moves in the second direction (e.g. downward) during the compression process, the fluid stored in the first region 2611 passes through the through-hole (e.g. the central guide through-hole) formed in the central guide member 2130 and flows along the routes defined by the upper retainer flow paths 2211-2, the first upper disc flow path 2212-2, and the second upper disc flow paths 2221-2. Accordingly, the hydraulic pressure can be generated by the flow of the fluid.

The second upper discs 2221 and the second lower discs 2222 may have a circumference (e.g. a horizontal cross-sectional area) larger than a circumference (e.g. a horizontal cross-sectional area) of the first upper discs 2212 and the first lower discs 2213, respectively. This may allow the fluid to generate the hydraulic pressure while the fluid is moving along the routes defined by the upper retainer flow paths 2211-2, the first upper disc flow paths 2212-2, and the second upper disc flow paths 2221-2.

When the compression process is continuously performed and the piston valve 2400 further moves in the second direction (e.g. downward), the hydraulic pressure may be further increased by the flow of the fluid. When the hydraulic pressure is equal to or higher than a limit hydraulic pressure (i.e. a preset hydraulic pressure) or exceeds the limit hydraulic pressure, the internal components may be damaged or the shapes of the internal components may be changed, thereby causing deterioration in performance of a shock absorber.

To solve this problem, 'the first upper discs 2212 and the first lower discs 2213' and 'the second upper discs 2221 and the second lower discs 2222' are configured to be temporarily deformable in shape (for instance, but not limited thereto, the entirety or a part of the surface of the disc can be deformed to be tilted or curved downward) when the applied hydraulic pressure is equal to or higher than the limit hydraulic pressure or exceeds the limit hydraulic pressure.

When 'the first upper discs 2212 and the first lower discs 2213' and 'the second upper discs 2221 and the second lower discs 2222' are curved downward, new flow paths (i.e. bypass flow paths) for the fluid, which were not formed when the discs were not curved in the second direction or was not present before the discs are curved, may be formed, such that the applied hydraulic pressure can be decreased to the limit hydraulic pressure or less.

The shock absorber 2000 according to the present disclosure includes the discs included in the disc modules that may be temporarily deformable in shape depending on the magnitude of the applied hydraulic pressure as described above, and therefore it is possible to prevent damage to the internal components or deterioration in performance even when the hydraulic pressure equal to or higher than the limit hydraulic pressure is applied.

In the exemplary embodiment, one limit hydraulic pressure (i.e., a first limit hydraulic pressure or e.g., a preset first hydraulic pressure) by which 'the first upper discs 2212 and the first lower discs 2213' are curved downward may be equal to or different from another limit hydraulic pressure (i.e., a second limit hydraulic pressure or e.g., a preset second hydraulic pressure) by which 'the second upper discs 2221 and the second lower discs 2222' are curved downward.

When the first hydraulic pressure and the second hydraulic pressure are different in value from each other 'the first upper discs 2212 and the first lower discs 2213' and 'the second upper discs 2221 and the second lower discs 2222' may be curved in a stepwise manner.

For example, assuming that the first hydraulic pressure is lower than the second hydraulic pressure, when the applied hydraulic pressure has a value between the first hydraulic pressure and the second hydraulic pressure, only 'the first upper discs 2212 and the first lower discs 2213' are curved downward to define a bypass flow path (e.g. a first bypass flow path), but 'the second upper discs 2221 and the second lower discs 2222' are not curved.

When the applied hydraulic pressure is equal to or higher than the second hydraulic pressure or exceeds the second hydraulic pressure, 'the second upper discs 2221 and the second lower discs 2222' are also additionally curved to define a bypass flow path (e.g. a second bypass flow path).

When the structure in which the discs are deformed to be curved in a stepwise manner is applied as described above, the hydraulic pressure having a predetermined value or more may be provided by the fluid passing through the second upper disc flow paths 2221-2 even when only 'the first upper discs 2212 and the first lower discs 2213' are curved downward. Therefore, it is possible to provide a higher damping force.

The first hydraulic pressure may be set depending on one or both of the number of first upper discs 2212 and the number of first lower discs 2213. In addition, the second hydraulic pressure may be set depending on one or both of the number of second upper discs 2221 and the number of second lower discs 2222.

In the exemplary embodiment, the first disc module 2210 may further include one or more first lower retainers 2214 disposed between the first lower discs 2213 and the second upper discs 2221 to ensure or form spaces for deforming or curving the first upper discs 2212 and the first lower discs 2213.

The second disc module 2220 may further include one or more second lower retainers 2223 disposed between the second lower discs 2222 and the lower guide member 2150 to ensure or form spaces for deforming or curving the second upper discs 2221 and the second lower discs 2222.

The number of the lower retainers 2214 and 2223 may vary depending on the size of the bypass flow path (e.g., the height of the space for deformation or curve) intended to be formed, a size of the shock absorber 2000, and a size of a space for mounting the shock absorber 2000 in an apparatus in which the shock absorber 2000 is mounted.

The specific structures and arrangements of the lower guide member 2150, the body valve 2300, the central guide member 2130, and the upper guide member 2110 are identical or similar to the structures and arrangements of the lower guide member 1150, the body valve 1300, the central guide member 1130, and the upper guide member 1110 described with reference to FIGS. 4 to 5. Therefore, detailed descriptions of the lower guide member 2150, the body valve 2300, the central guide member 2130, and the upper guide member 2110 will be omitted.

Hereinafter, a process of forming the bypass flow paths of the shock absorber 2000 will be described with reference to FIG. 14.

When the compression process is initiated, the piston valve 2400 moves in a second direction (e.g. downward) in which the piston valve 2400 presses the first and second elastic members 2120 and 2140. When a stroke of the piston valve 2400 is equal or greater than a predetermined stroke, the piston valve 2400 comes into contact with the upper guide member 2110.

Since the elastic modulus of the first elastic member 2120 is larger than the elastic modulus of the second elastic member 2140, the compression of the second elastic member 2140 is initiated first after the piston valve 2400 comes into contact with the upper guide member 2110.

In this case, after the fluid in the compression chamber 2610 passes through a through-hole (e.g. a central guide through-hole 2132) formed in the central guide member 2130, the fluid flows to the reserve chamber 2630 along 'a first route passing through the space between the lower guide member 2150 and the body valve 2300' and 'a second route sequentially passing through the upper retainer 2111, the first upper disc flow path 2212-2, the second upper disc flow path 2221-2, and the lower guide flow path 2154'.

When the compression process is continuously performed, the first elastic member 2120 begins to be compressed. As the first elastic member 2120 is compressed, the central guide member 2130 comes into contact with the upper retainer 2110.

Figure 14A:
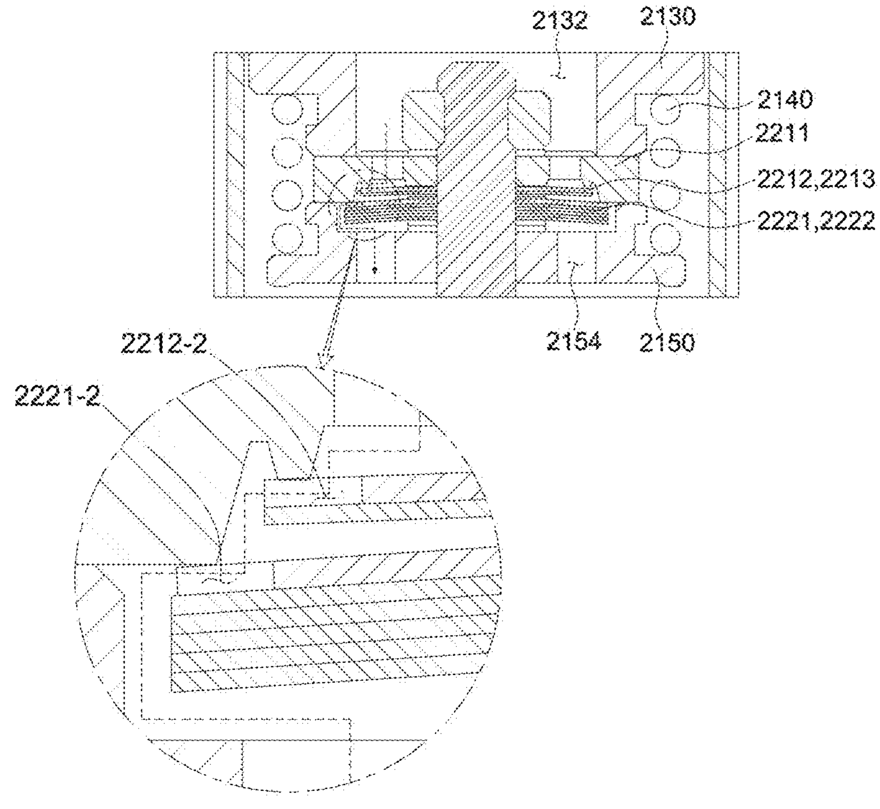
FIGS. 14A to 14C are cross-sectional views of a shock absorber for illustrating a process of forming a bypass route of the shock absorber according to another embodiment of the present disclosure.

In this case, as illustrated in FIG. 14A, 'the first route passing through the space between the lower guide member 2150 and the body valve 2300' is blocked, and the fluid in the compression chamber 2610 passes through the central guide through-hole 2132 and then flows to the reserve chamber 2630 along 'the second route sequentially passing through the upper retainer 2211, the first upper disc flow path 2212-2, the second upper disc flow path 2221-2, and the lower guide flow path 2154'. The hydraulic pressure can be generated by the flow of the fluid.

When the compression process is additionally performed continuously, the fluid in the chamber (first region), which is formed so that the first elastic member 2120 is disposed therein, is discharged through the flow paths (upper guide flow paths) formed in the upper guide member 2110, the first upper disc flow paths 2212-2, and the second upper disc flow paths 2221-2, such that the hydraulic pressure can be generated. In this case, the damping force is applied by the elastic force of the first elastic member 2120.

Figure 14B:
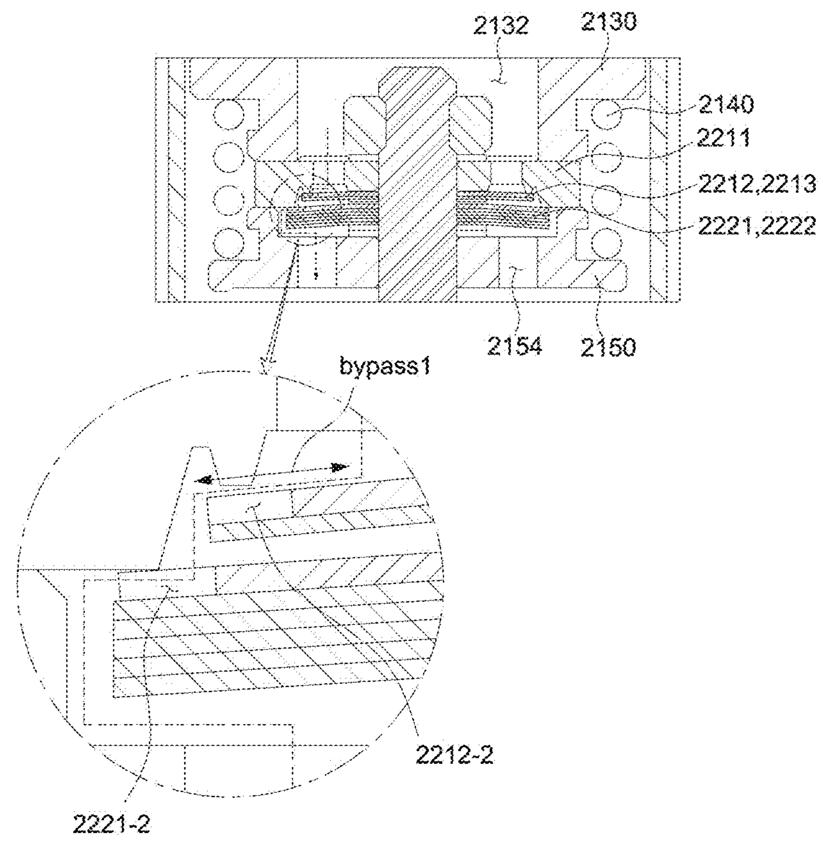

When the hydraulic pressure further increases and becomes equal to or higher than the first hydraulic pressure or exceeds the first hydraulic pressure, the first bypass flow path is formed as the first upper discs 2212 and the first lower discs 2213 are deformed or curved or bent downward, as illustrated in FIG. 14B.

In this case, the fluid is discharged through 'a third route sequentially passing through the upper retainer 2211, the first bypass flow path (bypass 1 of FIGS. 14B and 14C), and the lower guide flow paths 2154', such that the hydraulic pressure, which has been equal to or higher than the first hydraulic pressure or exceeded the first hydraulic pressure, can decrease. However, even in this case, the second upper discs 2221 and the second lower discs 2222 are not deformed to be curved, such that the hydraulic pressure generated by the flow of the fluid passing through the second upper disc flow paths 2221-2 can be provided.

Figure 14C:
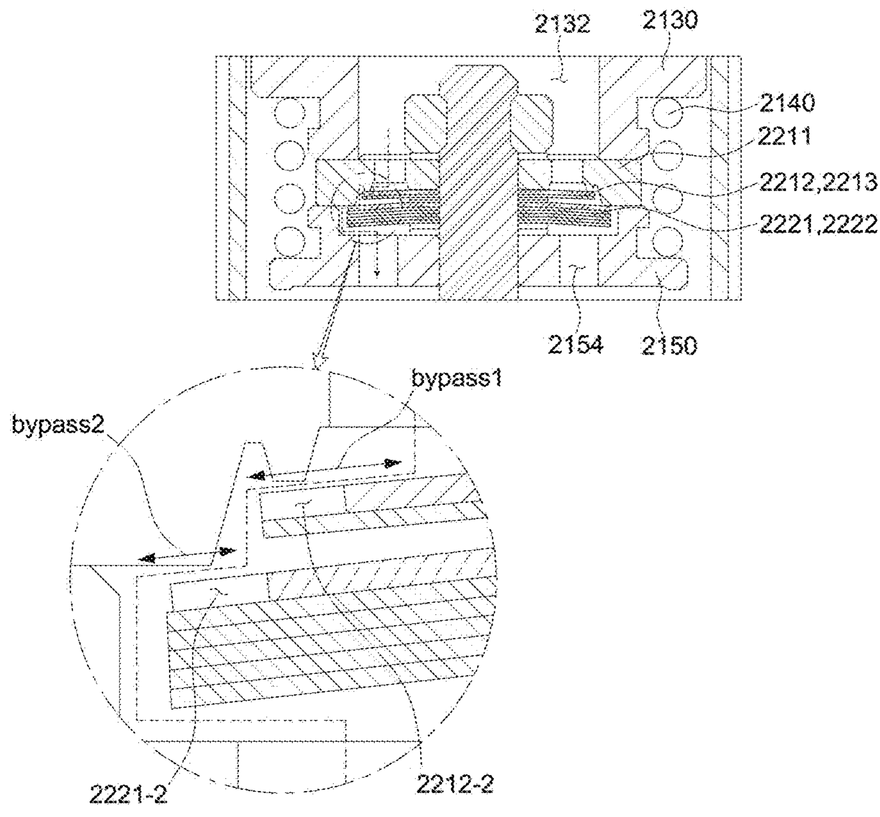

When the hydraulic pressure is increased by the continuous compression process (the applied hydraulic pressure becomes equal to or higher than the second hydraulic pressure or exceeds the second hydraulic pressure) even though the first bypass flow path is formed, the second upper discs 2221 and the second lower discs 222 are also curved in the second direction (e.g. downward), such that the second bypass flow path can be formed, as illustrated in FIG. 14C.

In this case, the fluid is discharged through 'a fourth route sequentially passing through the upper retainer 2211, the first bypass flow path, the second bypass flow path (bypass 2 of FIG. 14C), and the lower guide flow path 2154', such that the hydraulic pressure, which has been equal to or higher than the second hydraulic pressure or exceeded the second hydraulic pressure, can decrease.

The above description is simply given for illustratively describing the technical spirit of the present embodiment, and those skilled in the art to which the present embodiment pertains will appreciate that various changes and modifications are possible without departing from the essential characteristic of the present embodiment. Therefore, the embodiments are provided for illustrative purposes only but not intended to limit the technical concept of the present embodiment. The scope of the technical concept of the present embodiment is not limited thereto. The protective scope of the present embodiment should be construed based on the following claims, and all the technical spirit in the equivalent scope thereto should be construed as falling within the scope of the present embodiment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A shock absorber having a tube divided into a compression chamber and a rebound chamber by a piston valve movable in first and second directions, the shock absorber comprising:

an elastic module disposed in the compression chamber, the elastic module comprising first and second elastics, a central guide disposed between the first elastic and the second elastic and configured to be movable in the first and second directions, and a lower guide elastic disposed to support an end of the second elastic disposed between the central guide and the lower guide elastic; and a disc module disposed in the compression chamber, the disc module comprising one or more lower discs, an upper retainer having one or more first flow paths formed in the upper retainer and disposed between the central guide of the elastic module and one or more upper discs, and the one or more upper discs disposed between the upper retainer and the one or more lower discs, each of the one or more upper discs having one or more second flow paths formed at an outer peripheral surface of each of the one or more upper discs, wherein the upper discs and the lower discs are configured to be deformable to be curved in the second direction opposite to the first direction to form a bypass flow path in response to hydraulic pressure equal to or higher than a preset hydraulic pressure.

2. The shock absorber of claim 1, wherein the preset hydraulic pressure is set depending on one or both of a number of upper discs and a number of lower discs.

3. The shock absorber of claim 1, wherein the disc module further comprises one or more lower retainers disposed between the lower discs and the lower guide elastic of the elastic module, the one or more lower retainers configured to form a space for deformation of the upper discs and the lower discs in the second direction.

4. The shock absorber of claim 1, wherein the lower guide elastic comprises:

a lower guide body; and a first lower guide support part protruding in the first direction along an outer peripheral surface of the lower guide body and having a guide groove portion, the first lower guide support part configured to support the upper retainer of the disc module.

5. The shock absorber of claim 4, wherein lower guide flow paths formed along an outer peripheral portion of the lower guide groove portion penetrate the lower guide elastic in the first or second direction to communicate with the bypass flow path formed by the upper discs and the lower discs, and the upper discs and the lower discs are disposed in the guide groove portion of the first lower guide support part.

6. The shock absorber of claim 4, wherein the lower guide elastic further comprises a second lower guide support part extending from a lateral surface of the lower guide body in a direction perpendicular to the first or second direction, and the end of the second elastic is supported by the second lower guide support part of the lower guide elastic.

7. The shock absorber of claim 4, further comprising:

a body valve having a body valve through-hole formed in a central portion of the body valve and one or more body valve flow paths formed along a periphery of the body valve through-hole, the body valve having one or more body valve discharge grooves depressed in the first direction along an outer peripheral surface of the body valve, wherein the lower guide elastic has a lower guide projection portion protruding in the second direction along an outer peripheral surface of the lower guide body, and wherein the body valve is configured to support the lower guide elastic when the lower guide projection portion of the lower guide elastic contacts the body valve.

8. The shock absorber of claim 7, further comprising:

a body pin inserted in the body valve through-hole of the body valve, a through-hole of the lower guide elastic, a through-hole of the lower disc, a through-hole of the upper disc, and a through-hole of the upper retainer; and a nut disposed between the upper retainer and an end of the body pin and coupled to the body pin to fix the body pin.

9. The shock absorber of claim 1, wherein the central guide of the elastic module comprises:

a central guide body having a through-hole formed in the first or second direction;

a first central guide support part concavely formed along an outer peripheral portion of a first surface of the central guide body and configured to support the first elastic; and a second central guide support part protruding from a second surface of the central guide body and configured to support the second elastic.

10. The shock absorber of claim 1, wherein the elastic module further comprises an upper guide disposed between the piston valve and the first elastic and configured to be movable in the first and second directions in response to a movement of the piston valve, and wherein the upper guide of the elastic module comprises:

an upper guide body having a through-hole formed in the first or second direction;

an upper guide support part protruding along an outer peripheral portion of a first surface of the upper guide body and configured to support the first elastic; and upper guide protrusions protruding along an outer peripheral portion of a second surface of the upper guide body, spaced apart from each other, and configured to define one or more upper guide flow paths.

11. The shock absorber of claim 1, wherein the first elastic has a larger elastic modulus than the second elastic.

12. The shock absorber of claim 1, wherein the elastic module further comprises a piston ring disposed to cover a lateral surface of the central guide of the elastic module and configured to support movements of the central guide in the first and second directions, and an accommodation groove configured to accommodate the piston ring is formed on the lateral surface of the central guide of the elastic module.

13. A shock absorber having a tube divided into a compression chamber and a rebound chamber by a piston valve movable in first and second directions, the shock absorber comprising:

an elastic module disposed in the compression chamber, the elastic module comprising first and second elastics, a central guide disposed the first elastic and the second elastic and configured to be movable in the first and second directions, and a lower guide disposed to support an end of the second elastic disposed between the central guide and the lower guide;

a first disc module disposed in the compression chamber, the first disc module comprising one or more first lower discs, an upper retainer having one or more first flow paths formed in the upper retainer and disposed between the central guide of the elastic module and one or more first upper discs, and the one or more first upper discs disposed between the upper retainer and the one or more first lower discs, each of the one or more first upper discs having one or more flow paths formed in an outer peripheral surface of each of the one or more first upper discs; and a second disc module disposed in the compression chamber, the second disc module comprising one or more second lower discs, and one or more second upper discs disposed between the first lower discs and the one or more second lower discs, each of the one or more second upper discs having one or more flow paths formed in an outer peripheral surface of each of the one or more second upper discs, wherein the first upper discs and the first lower discs are configured to be deformable to be curved in the second direction opposite to the first direction to form a first bypass flow path in response to hydraulic pressure equal to or higher than a preset first hydraulic pressure, and wherein the second upper discs and the second lower discs are configured to be deformable to be curved downward in the second direction to form a second bypass flow path in response to hydraulic pressure equal to or higher than a preset second hydraulic pressure.

14. The shock absorber of claim 13, wherein the preset first hydraulic pressure is set depending on one or both of a number of first upper discs and a number of first lower discs.

15. The shock absorber of claim 13, wherein the preset second hydraulic pressure is set depending on one or both of a number of second upper discs and a number of second lower discs.

16. The shock absorber of claim 13, wherein the preset second hydraulic pressure is set to be higher than the preset first hydraulic pressure so that the second upper discs and the second lower discs are deformed to be curved after the first upper discs and the first lower discs are deformed to curved.

17. The shock absorber of claim 13, wherein a circumference of the one or more second upper discs is larger than a circumference of the one or more first upper discs, and a circumference of the one or more second lower discs is larger than a circumference of the one or more first lower discs.

18. The shock absorber of claim 13, wherein the first disc module further comprises one or more first lower retainers disposed between the one or more first lower discs and the one or more second upper discs and configured to form a space for deformation of the one or more first upper discs and the one or more first lower discs in the second direction.

19. The shock absorber of claim 13, wherein the second disc module further comprises one or more second lower retainers disposed between the one or more second lower discs and the lower guide of the elastic module and configured to form a space for deformation of the one or more second upper discs and the one or more second lower discs in the second direction.

20. The shock absorber of claim 13, wherein the first elastic has a larger elastic modulus than the second elastic.

* * * * *